Nov. 3, 1931.  G. E. ZAHN  1,830,156
HYDRAULIC CLUTCH
Filed Feb. 1, 1930   4 Sheets-Sheet 2

GEORGE E. ZAHN
INVENTOR

BY Victor J. Evans
ATTORNEY

Nov. 3, 1931.  G. E. ZAHN  1,830,156
HYDRAULIC CLUTCH
Filed Feb. 1, 1930   4 Sheets-Sheet 3

GEORGE E. ZAHN
INVENTOR

BY Victor J. Evans
ATTORNEY

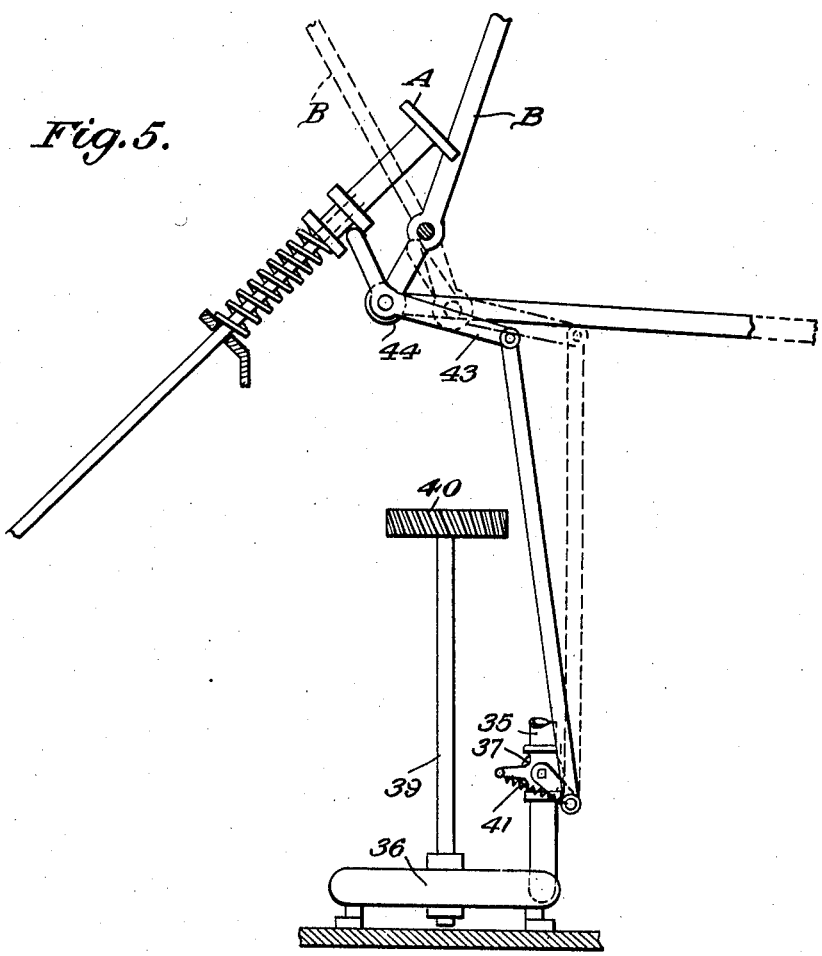

Patented Nov. 3, 1931

1,830,156

UNITED STATES PATENT OFFICE

GEORGE E. ZAHN, OF FREEDOM, PENNSYLVANIA

HYDRAULIC CLUTCH

Application filed February 1, 1930. Serial No. 425,235.

This invention relates to a hydraulic clutch, and more especially to a hydraulic transmission designed for use in connection with a variable speed motor subject to varying loads, the invention being an improvement over that forming the subject matter of an application filed by me on September 9, 1929, Serial No. 391,263.

An object of the invention is to provide an automatic valve adjustment for selecting the most efficient pulling ratio between the motor and load and a hydraulic ratchet which allows free movements of a shaft (within a casing in one direction), but engages the casing when the rotation of the shaft is reversed or the casing is rotated.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 5 is a fragmentary elevation partly in section showing the accelerator pedal in association with the control for the pump valve.

Figure 1:
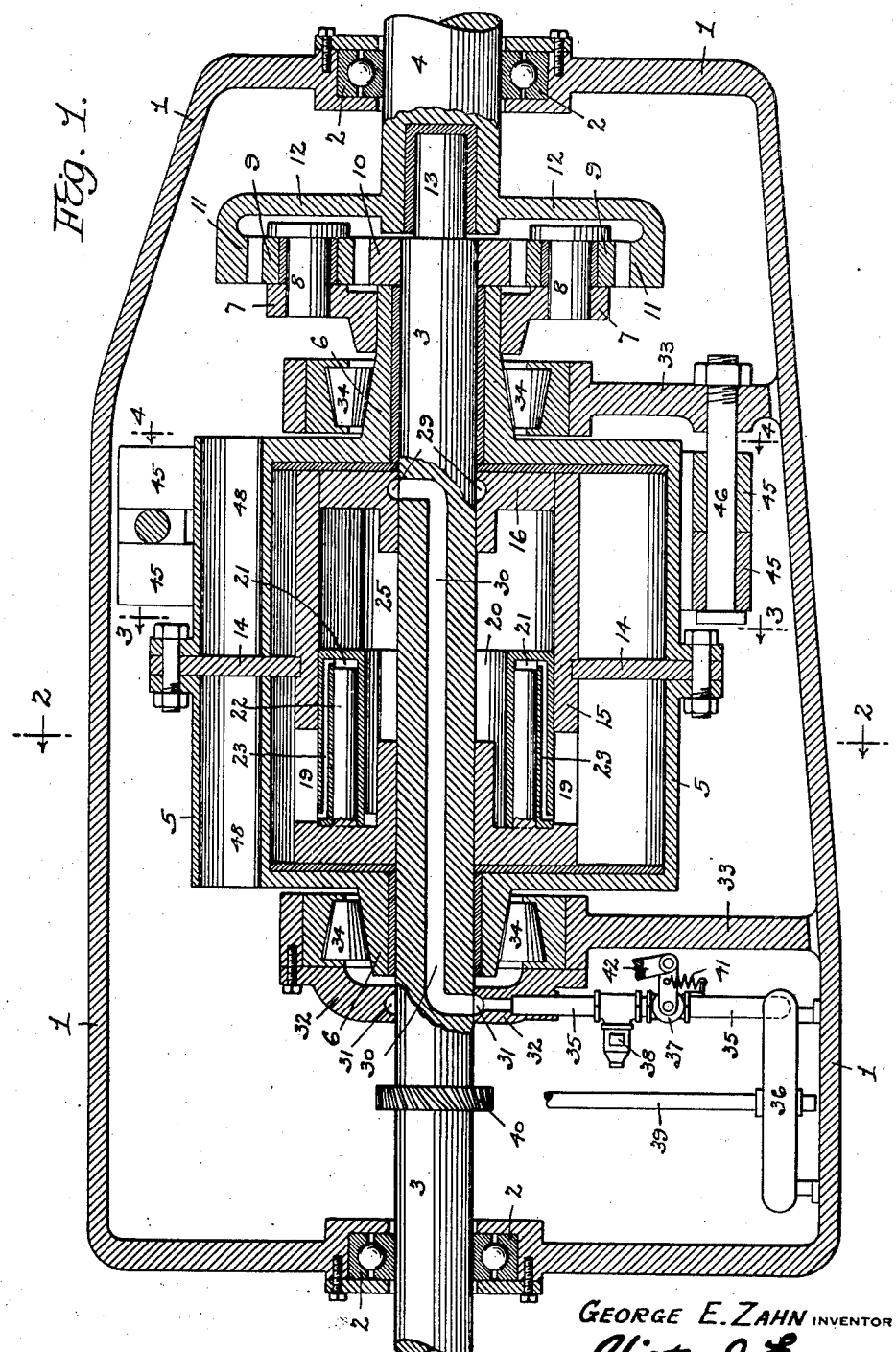
Figure 1 is a vertical sectional view through the invention.

In these drawings, the numeral 1 indicates a casing containing oil and having a bearing 2 at each end, and 3 indicates a drive or motor driven shaft extending into the casing through one bearing and 4 indicates the driven shaft extending into the casing through the other bearing. A casing 5, formed of two sections and having its ends closed, is rotatably arranged on the shaft 3 by having its hubs 6 rotatably engaging the shaft. One hub is provided with a flange 7 which carries the stub shafts 8 on which the pinions 9 are mounted, these pinions engaging a gear 10 carried by the shaft 3 and a ring gear 11, carried by a flange 12 on the shaft 4. The inner end of the shaft 4 has a socket which forms a bearing for the reduced end of the shaft 3, as shown at 13 in Figure 1. The pinions and gears form a planetary gear train whose movements are controlled by the casing 5 and the shaft 3. The casing 5 has an eccentric bore and a spacing ring 14 is fastened between the two parts of the casing and divides the bore into two parts or chambers. This ring is also formed in two parts and its bore is concentric with the axis of the shaft 3 around which the whole transmission revolves.

Figure 2:
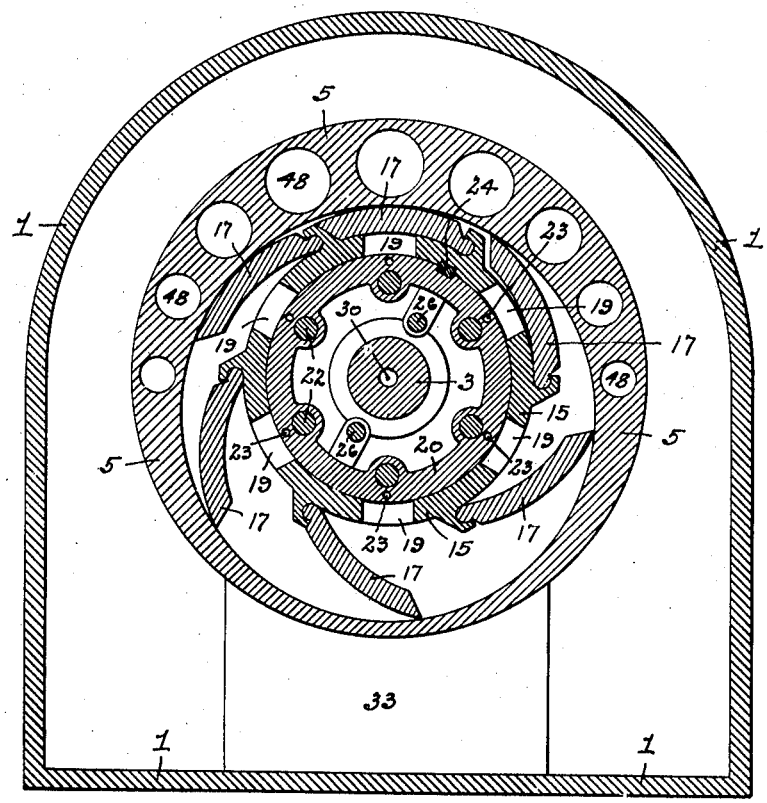
Figure 2 is a section on line 2—2 of Figure 1.
Figure 6:
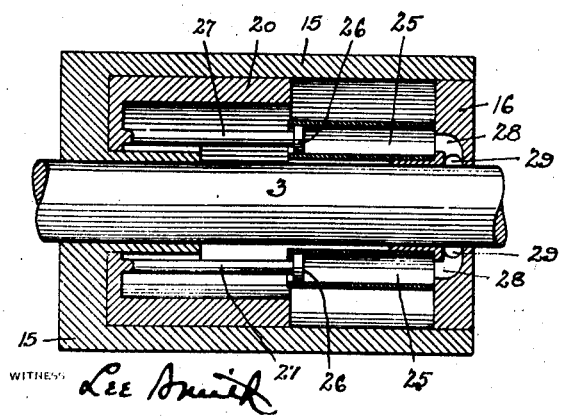
Figure 6 is a longitudinal sectional view through the drive casing and the sliding valve and showing the cylinders and pistons operated by the pressure from the pump for holding the valve in closed position.
Figure 3:
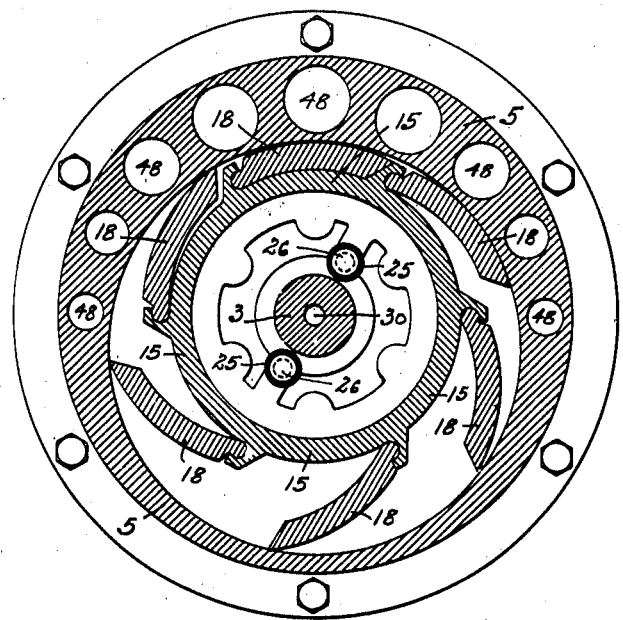
Figure 3 is a section on line 3—3 of Figure 1.
Figure 4:
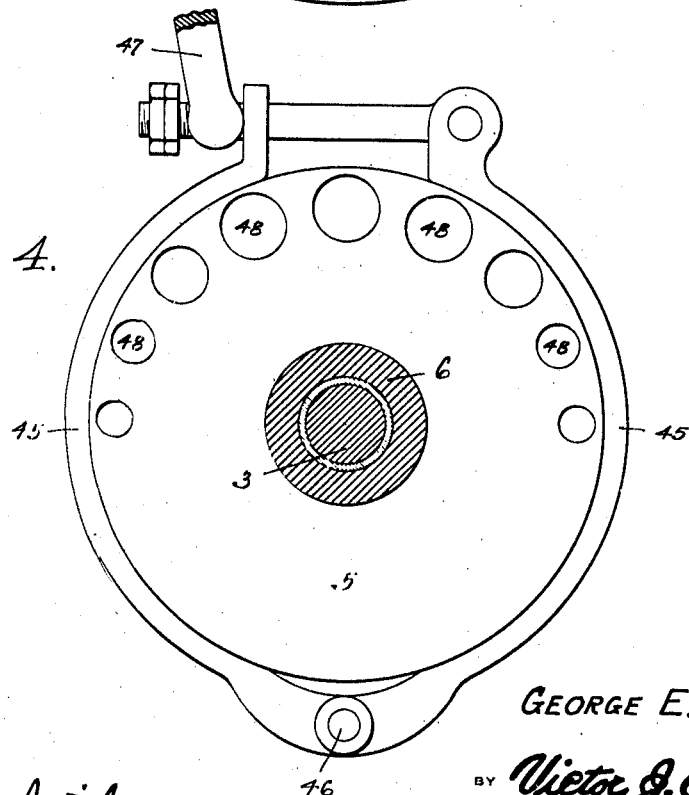
Figure 4 is a section on line 4—4 of Figure 1.

A driving member 15 is arranged within the casing 5 and has one end closed and fixed to the shaft 3 so that the member 15 will rotate with the shaft 3. The other end of the member 15 is closed by a plate 16 and is fastened to the shaft 3 and forms a rest for the open end of the member 15. This member 15 is eccentrically arranged with respect to the bore of the casing 5 and has its ends abutting the ends of the casing 5. The member 15 carries two sets of oscillating wings 17 and 18, the wings 17 being arranged in that part of the bore of casing 5 in front of the partition 14 and the set 18 being in that part of the bore in rear of the partition 14. One set of wings is reversely arranged to the other set, as shown in Figures 2 and 3. The member 15 is provided with the ports 19, one under each wing 17, but there are no ports under the wings 18.

A cylindrical valve 20 is slidably arranged in the member 15 and acts to control the ports 19. This valve is formed with a number of cylinders 21, each containing a piston 22, the forward end of which abuts or is connected with the forward end of the member 15, so that the pistons are stationary, while the cylinders, of course, move with the valve.

A passage 23 connects the rear end of each cylinder with a port 19 and the valve is held against rotary movement in the member 15 by means of a key 24 engaging keyways in the valve and in said member 15. Thus the valve must rotate with the member 15 and the outer ends of the passages 23 in valve 20 always remain in proper relation to the ports 19.

Cylinders 25 are carried by the member or plate 16 and the pistons 26 of said cylinders have their rods 27 bear against the front end of the valve so that the pistons will move with the valve. A passage 28 connects the rear end of each cylinder 25 with a groove 29 in the inner circumference of the member 16 and a passage 30 in shaft 3 connects the groove 29 with a groove 31 in a ring 32 through which the shaft 3 passes, this ring being connected to one of the bearing posts 33 in the casing 1, these bearing posts supporting the bearings 34 for the hubs 6 of the casing 5. A pipe 35 connects the groove 31 with a pump 36 in the casing 1 and this pipe contains a valve 37 and a pressure regulator 38. The pump shaft 39 is driven from the shaft 3 through the worm gearing 40 so that the volume of the pump will vary with the speed of the motor. A spring 41 holds the valve in either its open or closed position and a rod 42 is connected with the arm of the valve and the other end of the rod is connected to a rocker arm 43. This rocker arm is moved by pressure on the gas feed pedal or accelerator A, and the arm has an eccentric mounting 44 actuated by a movement of the reverse lever B so as to disengage the rocker arm from the accelerator or pedal when the reverse lever is actuated, which allows the valve 37 to be in a position with the pressure shut off from the pump while the motor speed is accelerated.

A brake 45 is provided for the casing 5, the two sections of which are supported by the rod 46, and said brake is operated by a lever 47. The casing 5, in its thick portions, is formed with the holes 48 to balance the unit.

Assuming that the motor is started and is running at idling speed, then the shaft 3, member 15, valve 20, ring 16 and cylinders 21 and 25 all revolve together. The tendency of the casing 5 is to stand still so that the fluid is acted on by the wings 17 as they move in toward the member 15 so that pressure is built up under the inwardly moving wings and this pressure is transmitted through the passages 23 into the rear ends of the cylinders 21, thus moving the valve 20 rearwardly so that the ports 19 are opened, allowing the compressed fluid to escape across the unit into that part of the chamber formed by the eccentric bore of the casing 5, where the wings are free to swing away from the member 15. The opening movement of the valve 20 also moves the pistons 26 into the cylinders 25, because in this idling position, the valve 37 is closed and there is no pressure in the cylinders 25. Thus the wings 17 are free to oscillate and casing 5 remains stationary, unless driven by some exterior means.

In the arrangement shown in the drawings, the cylinder 5 will revolve around its axis at the rate of one revolution to 2¼ revolutions of the shaft 3, due to the idlers 9 following the gear 10 within the internal gear 11. If casing 5 is caused to revolve faster than the above ratio, then the internal gear 11 must revolve in the same direction and the ratio will decrease as cylinder 5 catches up to shaft 3. When both shaft and cylinder or casing 5 are revolving at the same speed, the internal gear 11 will also revolve at the same speed, thereby constituting a direct drive from the shaft 3 to the shaft 4. This is accomplished by pressing upon the accelerator to cause the rocker arm 43 to tilt so that the rod 42 will open the valve 37 and thus cause the pressure from the pump to pass through the pipe 35, passage 30 and passages 28 into the cylinders 25, where the fluid pressure will act against the pistons 26 and cause the rods 27 to move the valve 20 forwardly and thus close the ports 19. This closing movement of the valve will cause a back pressure in the cylinders 21 of the valve. The proper amount of pressure against the pistons 26 to prevent the valve 20 from closing too hard is secured by adjusting the pressure regulator 38 which operates by spring tension and overflow. Any increased speed of the motor increases the speed of the pump and as the overflow through the pressure regulator is limited, the increased speed of the pump also increases the pressure within the cylinders 25. It will be noted also that as the motor and pump are speeded up, the member 15 also increases its speed directly and while the pistons 26 are exerting greater pressure against the valve 20, the pressure within the cylinders 21 is also increasing, due to the oscillating wings picking up the load as valve 20 closes the ports 19. It will be seen that the pressure under the wings 17 tends to force the valve 20 open and that as the valve opens, the pressure drops, allowing slippage of the wings 17 within the eccentric chamber of the casing 5. This in turn allows the motor to speed up and either builds up more pressure or forces the valve 20 open to a greater extent. In other words, the pressure under the wings depends on the load. The pressure within the cylinders 25 tending to force the valve 20 shut, is dependent on the motor speed and the adjustment of the overflow and spring tension of pressure regulator 38. The force acting on the valve 20 to move it in either direction, is equal to the difference in force within the cylinders 21 acting to move the valve 20 open and the force within the cylinders 25 acting to move the valve 20 shut. Thus if the pressure within the cylinders 25 is regulated at 38 to hold the valve 20 closed while the motor is running at its most efficient pulling speed with a maximum load on the casing 5, the wings 17 will be held outwardly against the eccentric chamber of the casing 5 with a force that will cause the casing 5 to revolve with the driving member 15, but if the load on the casing 5 should become greater than the motor can pull at a fast and efficient speed, the motor will slow down, causing a drop of pressure in the cylinders 25, while the pressure in the cylinders 21 remains maximum. This will force the valve 20 open, allowing pressure fluid to escape across the unit and causing slippage of the wings within the ecentric chamber, lightening the load on the motor and allowing it to pick up speed. The increasing speed of the motor again builds up the pressure in cylinders 25 and consequently in cylinders 21 and so a balance is struck and the valve 20 automatically opens the ports 19 to the most efficient operating position.

To stop the driving power of this transmission, all that is necessary is to take the pressure off of the accelerator. The spring under the pedal pushes it back, tilting rocker arm 43 and moving rod 42 to close valve 37 and thus shutting off the pressure from the pump to the cylinders 25 and pressure in the cylinders 21 forces the valve 20 open, allowing the motor to idle.

Attention is called to the fact that all forward driving power is obtained through the forward half of the unit.

The hydraulic ratchet shown occupies the other half of the unit and it is the same as the transmission unit, except that it has no valve or ports under the wings. When driven by the motor, the wings exert no pressure against the walls so the inner parts revolve while the outer casing 5 stands still or revolves with the inner part if driven by some other means, but if the speed of the outside casing 5 should get ahead of the inner casing or member 15, then the wings 18 cannot close in, due to the fluid pressure under them and both parts 5 and 15 must revolve together as a unit.

I use this device with this transmission to utilize the retarding power of the motor to hold back the speed of the driven shaft 4. Greater retarding effect can be obtained by a slight application of the brake 45 against the casing 5. In Figure 5 of the drawings the accelerator pedal is shown at A, while the reverse lever is shown at B.

Reverse motion of the shaft 4 is obtained by pressing upon a reverse lever B. The first action of this lever disengages the rocker arm 43 through eccentric mounting 44 from the accelerator pedal, allowing the valve 37 to remain in a position to shut off pressure from the pump so that no pressure is exerted to close valve 20. The next action causes the brake 45 to grip the casing 5, holding it stationary. As the pins on which the idler gears 9 of the planetary are fastened to this casing through the flange 7 and the hubs of the casing 5, and the gear 10 of the planetary is secured to the shaft 3 which is revolving with the motor, a standard planetary reverse is obtained.

Thus it will be seen that I have provided an automatic valve actuated by fluid pressure taken from under the wings to move the valve to an open position and fluid pressure taken from a pump, the volume of which varies with the speed of the motor, to move the valve to a closed position so that the valve automatically selects the most efficient pulling position relative to the speed of the motor and the load, and a hydraulic ratchet including an outer casing having a part of its bore eccentric to the axis on which it revolves, an inner casing having mounted on its periphery oscillating wings and end walls on the outer casing to prevent the escape of fluid from under the wings, so that in operation the wings fold up and the inner casing revolves independent of the outer casing when traveling in one direction, but when caused to revolve in a reverse direction, the wings are held outwardly against the eccentric bore of the outer casing by fluid pressure which has no means of escape, causing both inner and outer casing to revolve as a unit.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a drive member including a casing, a driven member including a casing surrounding the first casing, said second casing having an eccentric chamber therein and the first casing having ports therein placing the interior thereof in communication with the eccentric chamber, pivoted wings carried by the first casing and adapted to contact the walls of the eccentric chamber, fluid in the casings, a valve member for controlling the ports, means whereby said valve member is moved to an open position by pressure of fluid created by the inward movement of the wings, means for causing fluid pressure to move the valve member to a closed position and means for varying the volume of the last mentioned means by the speed of the drive member.

2. A device of the class described comprising a drive member including a casing, a driven member including a casing surrounding the first casing, said second casing having an eccentric chamber therein and the first casing having ports therein placing the interior thereof in communication with the eccentric chamber, pivoted wings connected with the first casing and adapted to contact the walls of the eccentric chamber, fluid in the casings, a valve member for controlling the ports, means whereby the valve is moved to open position by fluid pressure created by the inward movement of the wings, a pump for creating fluid pressure to move the valve to a closed position and means for varying the volume of the pump according to the speed of the motor.

3. A device of the class described comprising a drive member including a casing, a driven member including a casing surrounding the first casing, said second casing having an eccentric chamber therein and the first casing having ports therein placing the interior thereof in communication with the eccentric chamber, pivoted wings connected with the first casing and adapted to contact the walls of the eccentric chamber, fluid in the casings, a valve member for controlling the ports, means whereby the valve is moved to open position by fluid pressure created by the inward movement of the wings, a pump for creating fluid pressure to move the valve to a closed position, means for driving the pump from the drive member and a pressure regulator arranged in the discharge of the pump.

4. A device of the class described comprising a drive shaft, a driven shaft, a casing rotatably arranged on the drive shaft and having an eccentric interior, a concentric casing attached to the drive shaft and located in the first casing and having ports therein, wings pivoted to the second casing and contacting the walls of the first casing, with a wing over each port, a cylindrical valve slidably arranged in the second casing for controlling the ports, means whereby fluid compressed by the inwardly moving wings will move the valve to open position and means including a pump for causing fluid to move the valve to closing position.

5. A device of the class described comprising a drive shaft, a driven shaft, a casing rotatably arranged on the drive shaft and having an eccentric interior, a concentric casing attached to the drive shaft and located in the first casing and having ports therein, wings pivoted to the second casing and contacting the walls of the first casing, with a wing over each port, a cylindrical valve slidably arranged in the second casing for controlling the ports, cylinders in the valve, stationary pistons in the cylinders, the walls of the cylinders having passages connecting their rear ends with the ports, cylinders carried by the rear end of the second casing, pistons in said cylinders and connected with the valve, a pump for forcing fluid into the last mentioned cylinders to move the valve to port closing position, the fluid compressed by the inwardly moving wings entering the first mentioned cylinders to move the valve to open position and means for operating the pump from the drive shaft and means for imparting movement to the driven shaft from the first casing.

6. A device of the class described comprising a drive member including a casing, a driven member including a casing surrounding the first casing, said second casing having an eccentric chamber therein and the first casing having ports therein placing the interior thereof in communication with the eccentric chamber, pivoted wings carried by the first casing and adapted to contact with the walls of the eccentric chamber, fluid in the casings, a valve member for controlling the ports, means whereby said valve member is moved to an open position by pressure of fluid created by the inward movement of the wings, means for causing fluid pressure to move the valve member to a closed position, means for varying the volume of the last mentioned means by the speed of the drive member and hydraulic ratchet means between the first casing and the second casing.

7. A device of the class described comprising a drive member including a casing, a driven member including a casing surrounding the first casing, said second casing having an eccentric chamber therein and the first casing having ports therein placing the interior thereof in communication with the eccentric chamber, pivoted wings carried by the first casing and adapted to contact the walls of the eccentric chamber, fluid in the casings, a valve member for controlling the ports, means whereby said valve member is moved to an open position by pressure of fluid created by the inward movement of the wings, means for causing fluid pressure to move the valve member to a closed position, means for varying the volume of the last mentioned means by the speed of the drive member and hydraulic ratchet means between the first casing and the second casing, such means comprising wings pivoted to the first casing and adapted to engage the walls of the bore of the second casing, said bore being eccentric to the first casing and that part of the bore in which the wings operate forming a closed chamber containing fluid.

In testimony whereof I affix my signature.

GEORGE E. ZAHN.